United States Patent [19]

Sayegh

[11] Patent Number: 5,214,674
[45] Date of Patent: May 25, 1993

[54] METHOD AND APPARATUS FOR CARRIER SYNCHRONIZATION ACQUISITION IN A DIGITAL BURST MODE COMMUNICATION SYSTEM

[75] Inventor: Soheil I. Sayegh, Germantown, Md.

[73] Assignee: Comsat, Clarksburg, Md.

[21] Appl. No.: 645,768

[22] Filed: Jan. 25, 1991

[51] Int. Cl.$^5$ .............................................. H04L 27/06
[52] U.S. Cl. ........................................ 375/97; 375/39; 455/60; 455/265; 328/155; 329/304
[58] Field of Search ................... 375/39, 97; 455/257–265, 60; 328/155; 329/304, 310

[56] References Cited

U.S. PATENT DOCUMENTS

| | | | |
|---|---|---|---|
| 3,522,537 | 8/1970 | Boughtwood | 375/39 |
| 4,807,256 | 2/1989 | Holmes et al. | 375/97 |
| 4,914,676 | 4/1990 | Iwamatsu et al. | 455/60 |
| 4,977,580 | 12/1990 | McNicol | 375/97 |

Primary Examiner—Curtis Kuntz
Assistant Examiner—Young Tse
Attorney, Agent, or Firm—Sughrue, Mion, Zinn, Macpeak & Seas

[57] ABSTRACT

An apparatus for obtaining carrier synchronization acquisition in a digital burst mode communication system is provided. An accurate estimate of the carrier phase of the unmodulated preamble, $\hat{\theta}$, is obtained by determining which of 256 intervals $X_o^2 + X_e^2$ fall into, and by evaluating which of 256 intervals $Y_o^2 + Y_e^2$ fall into. A quantized value is assigned to the generated output code for both X and Y inputs. The square root and arc tangent are evaluated to determine the value $\hat{\theta}$.

4 Claims, 2 Drawing Sheets

METHOD AND APPARATUS FOR CARRIER SYNCHRONIZATION ACQUISITION IN A DIGITAL BURST MODE COMMUNICATION SYSTEM

FIELD OF THE INVENTION

The present invention is directed to a method and apparatus for carrier synchronization acquisition in a digital burst communication system. Specifically, a simple programmable read-only memory (PROM) implementation for acquisition of carrier synchronization is provided given samples taken from a binary alternating preamble at the rate of two samples/symbol.

BACKGROUND OF THE INVENTION

In a digital burst mode communication system, a binary alternating preamble normally precedes the data. At a receiver, an oscillator of the same frequency as the transmitted waveform is used, but the phase difference between the received sinusoidal waveform and the oscillator is unknown and needs to be estimated for coherent demodulation. This is known as the carrier acquisition problem.

In a digital demodulator implementation, samples are taken from the in-phase and quadrature components x(t) and y(t), respectively, as shown in FIG. 1. A recovered or estimated carrier is passed through a phase shifter 10 which provides an inphase carrier to mixer 12 and a quadrature carrier to mixer 14. This results in a data stream I=x(t) for the in-phase channel and a data stream Q =y(t) for the quadrature channel, and these are sampled at reference numerals 16 and 18.

The samples are usually taken at a rate equal to or larger than two samples/symbol. Normally, two samples/symbol makes for an efficient implementation, and this is the case considered below. Samples taken on the X channel during the preamble are sequentially numbered as $X_1, X_2, X_3, X_4, X_5, \ldots$ Due to the alternating nature of the binary preamble, and moreover, since the samples are taken at a rate of two samples/symbol, it follows that $X_1 = -X_3 = X_5 \ldots$ in the absence of noise. Therefore, in order to decrease the effect of noise, a quantity $X_{odd}$ is formed by combining the odd-numbered samples on the X channel in the following manner:

$$X_{odd} = X_1 - X_3 + X_5 \ldots$$

This has the effect of averaging out the value of the odd-numbered samples. The same procedure is repeated to obtain $X_{even}$, $Y_{odd}$, and $Y_{even}$.

Given four values ($X_e$, $X_0$, $Y_e$, $Y_0$) of 8 bits (1 byte) each, it is desired to find a simple PROM implementation to evaluate $$\theta = \tan^{-1} \sqrt{(Y_0^2 + Y_e^2)/(X_0^2 + X_e^2)} \qquad (1)$$

such that the maximum error in evaluating $\theta$ (because of the finite precision resulting from the finite PROM size) is as small as possible.

This problem arises when implementing a digital demodulator for digital burst mode communication. As noted above, an alternating preamble usually precedes the data. At the receiver, an oscillator of the same frequency as the transmitted waveform is used, but the phase difference, $\theta$, between the received sinusoidal waveform and the oscillator is unknown, and an estimate of it is desired. As shown in FIG. 1, samples are available from the in-phase and quadrature components x(t) and y(t), respectively, sampled at the rate of two samples/symbol (half a sinusoidal period represents one symbol). By denoting the samples on the X channel as $X_1, X_2, X_3, X_4 \ldots$, and the samples on the Y channel as $Y_1, Y_2, Y_3, \ldots$, the quantities $X_0, X_e, Y_0,$ and $Y_e$ are formed as follows:

$$X_0 = X_1 - X_3 + X_5 - X_7 \ldots$$

$$X_e = X_2 - X_4 + X_6 - X_8 \ldots$$

$$Y_0 = Y_1 - Y_3 + Y_5 - Y_7 \ldots \qquad (2)$$

$$Y_e = Y_2 - Y_4 + Y_6 - Y_8 \ldots$$

where $$X_1 = \cos\theta \sin\alpha + noise$$

$$X_2 = -\cos\theta \cos\alpha + noise$$

$$X_3 = -\cos\theta \sin\alpha + noise \qquad (3)$$

$$X_4 = \cos\theta \cos\alpha + noise$$

repeats ever four samples and $$Y_1 = \sin\theta \sin\alpha + noise$$

$$Y_2 = -\sin\theta \cos\alpha + noise$$

$$Y_3 = -\sin\theta \sin\alpha + noise \qquad (4)$$

$$Y_4 = \sin\theta \cos\alpha + noise$$

repeats ever four samples, and where $\alpha$ is the phase displacement between the sinusoidal signal and the sampling clock.

The purpose of computing $X_0$, $X_e$, $Y_0$, and $Y_e$ as above before estimating $\theta$ is to decrease the noise variance by averaging out over several symbols before performing squaring operations. Clearly, $$Y_o^2 + Y_e^2 \approx \sin^2\theta$$

and $$X_o^2 + X_e^2 \approx \cos^2\theta$$

from which it follows that equation (1) is an estimate of $\theta$ as stated above.

Note that the value of $\theta$ estimated above will be in the first quadrant (i.e., between 0° and 90°). Therefore, there is a four-fold ambiguity in the value of $\theta$ that needs to be resolved. This can be taken care of in the detection of a unique word that follows the preamble. It is also possible to reduce the four-fold ambiguity to a two-fold ambiguity (which must then be resolved by the unique word) by examining the, sign of $X_0X_e + Y_0Y_e$.

This method of averaging several symbols before computing an estimate of the carrier phase is well known and widely used. The present invention is directed to finding a simple PROM implementation to obtain an accurate estimate of the carrier phase given four quantities $X_{odd}$, $X_{even}$, $Y_{odd}$, and $Y_{even}$.

A method of estimating the carrier phase known in the art is shown in FIG. 2. Basically, the method of the prior art consists of squaring and adding operations performed on $X_{odd}$, $X_{even}$, $Y_{odd}$, and $Y_{even}$.

First, $(X_e)^2$ is provided at the output of squaring circuit 20, with the most significant byte being loaded into adder 22 and the least significant byte loaded into adder 24. $(-Xo)^2$ is then provided at the output of squaring circuit 20, and is added to $(X_e)^2$ in adders 22 and 24. The log of $(X_e)^2+(X_o)^2$ is then calculated in log circuit 26. The log of $(Y_e)^2+(Y_o)^2$ is similarly provided by circuits 28-34. The quantity $(Y_0^2+Y_e^2/(X_0^2+X_e^2)$ is then obtained by subtracting the output of log circuit 34 from the output of log circuit 26 in subtracters 36 and 38. Circuit 40 then obtains the square root by dividing by 2, and calculates $\theta$ by taking the arctan of the result.

The additions are performed with full precision, i.e., 2 bytes, obtained at the adder's outputs because of the desire to obtain an accurate estimate. Next, a division operation is performed. However, in the method of the prior art, the division cannot be accomplished in a PROM since the numerator and the denominator are each 2 bytes long. Therefore, division is accomplished by computing logarithms, subtracting the results, and then taking exponentials, all implemented in PROMs. Finally, an inverse tangent operation is performed to obtain the desired carrier phase estimate. The disadvantage of the method of the prior is that several PROMs and latches (not shown) are required in order to estimate the desired angle.

SUMMARY OF THE INVENTION

An object of the present invention is to overcome the problems inherent in the prior art by providing a method and apparatus which can accurately estimate the carrier phase of the unmodulated preamble in a digital burst mode communications system with a minimum amount of hardware.

With the present invention, it is possible to obtain an accurate estimate of the carrier phase of the unmodulated preamble by using only two PROMS and a latch. Mathematically, this corresponds to evaluating the inverse tangent of a square root. The quantity under the square root is a ratio of sums of squares. The numerator is $Y^2_{odd}+Y^2_{even}$ and the denominator is $X^2_{odd}+X^2_{even}$.

The first of the two PROMS is referred to as the coded quantized sum of squares (CQSS) PROM performing the following tasks. Given two inputs of one byte (8 bits) each, the sum of squares of these two inputs is obtained, resulting in a twobyte-long quantity. The output of the CQSS PROM must be confined to one byte, however, because of the input requirements of the second PROM. Therefore, the two-byte-long sum of squares must be reduced to one byte with a minimum loss of accuracy. This is achieved by using a quantization scheme based on logarithmic quantization.

When the quantity to be quantized is small, a further improvement over logarithmic quantization is possible. This is due to the highly non-uniform distribution of sums of squares of small integers. The number of quantization intervals is chosen as 256 in the preferred embodiment.

The output of the CQSS PROM is a code number indicating which of the quantization intervals the sum of squares falls into. Thus, the sum of squares representing the numerator is accurately quantized and the result is stored in a latch using only one byte. This is then repeated for the denominator. The quantities (one byte each) are then applied to the second PROM, where the code number is translated into its actual value: division, square root, and inverse tangent operations take place, the results being precomputed and stored in the PROM. The carrier estimate then appears at the output.

DESCRIPTION OF THE INVENTION

Figure 1:
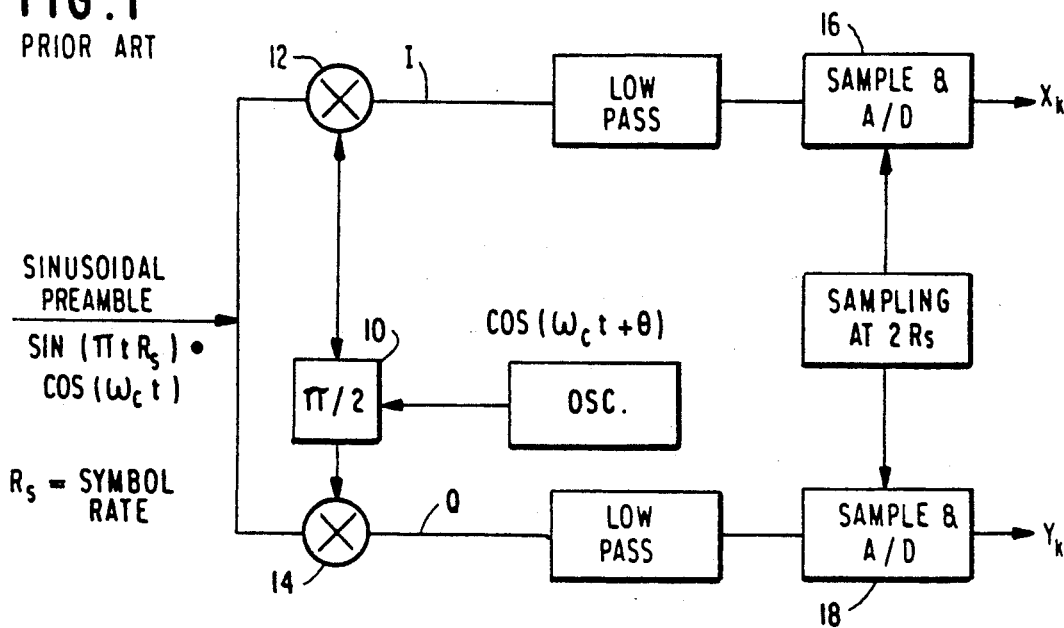
FIG. 1 is a block diagram showing portions of a conventional digital demodulator.
Figure 2:
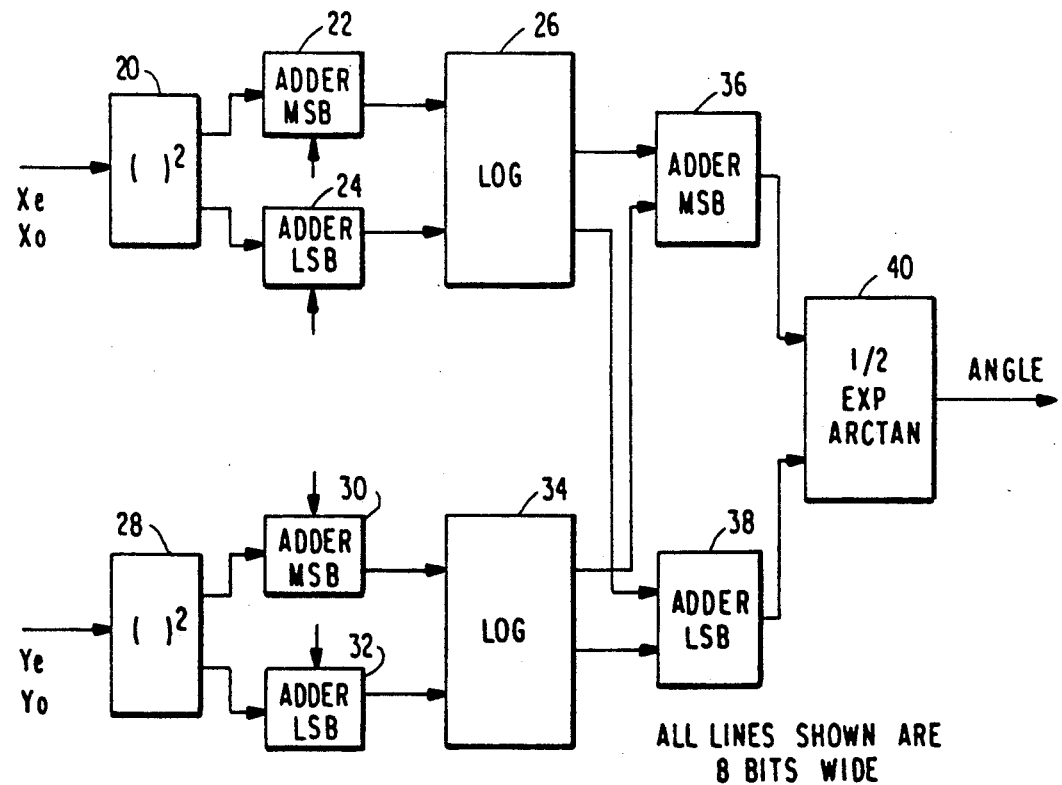
FIG. 2 is a block diagram showing a prior art system for estimating carrier phase array.
Figure 3A:
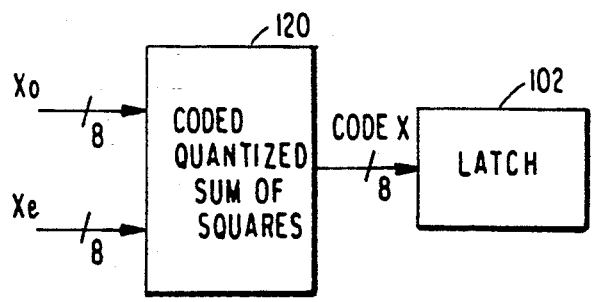
FIGS. 3A and 3B illustrate a preferred embodiment to the present invention.
Figure 3B:
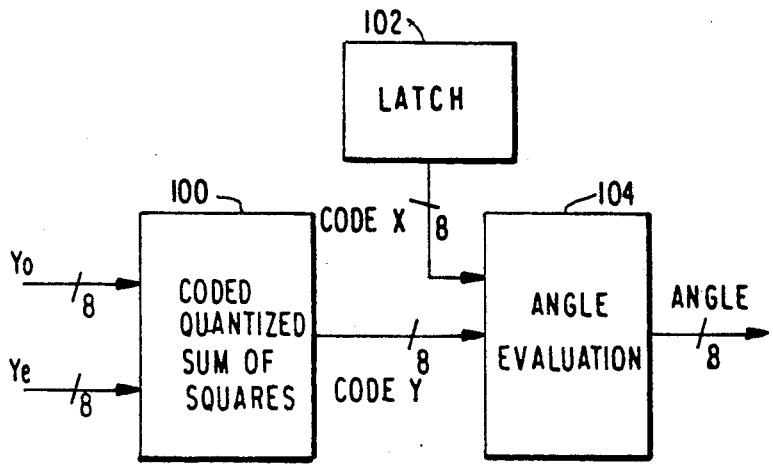

FIGS. 3A and 3B illustrate the preferred embodiment of the present invention. As shown in FIGS. 3A and 3B, an accurate estimate of the carrier phase of an unmodulated preamble is obtained using only 2 PROMS and a latch.

Figure 4:
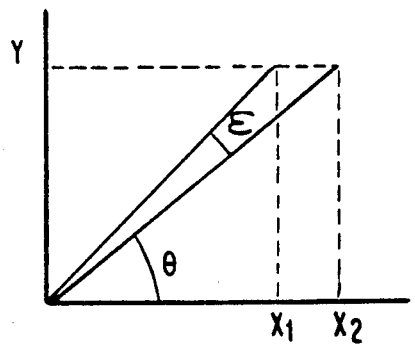
FIG. 4 illustrates the relationship between $X_1$, $X_2$, $Y$, $\theta$, and $\epsilon$.

As background information, a simple mathematical derivation follows. Given $X_1>0$, it is desired to determine the largest value of $X_2$, for which an angle $\epsilon$ of FIG. 4 is less than or equal a fixed amount $\epsilon_{max}$ for any given Y. It can be mathematically shown that the answer is $X_2=aX_1$ where $$a = 1 + 2\Delta^2 + 2\Delta\sqrt{1+\Delta^2} \quad (1)$$

where $\Delta$ = tangent of $\epsilon_{max}$, (2)

and that the value of Y resulting in $\epsilon=\epsilon_{max}$ is $$Y = \sqrt{X_1 X_2} = X_1\sqrt{a}. \quad (3)$$

Also, as noted above, a similar procedure gives identical results if the X's and Y's above are interchanged. Accordingly, the following conclusion can be derived from the results.

Figure 5:
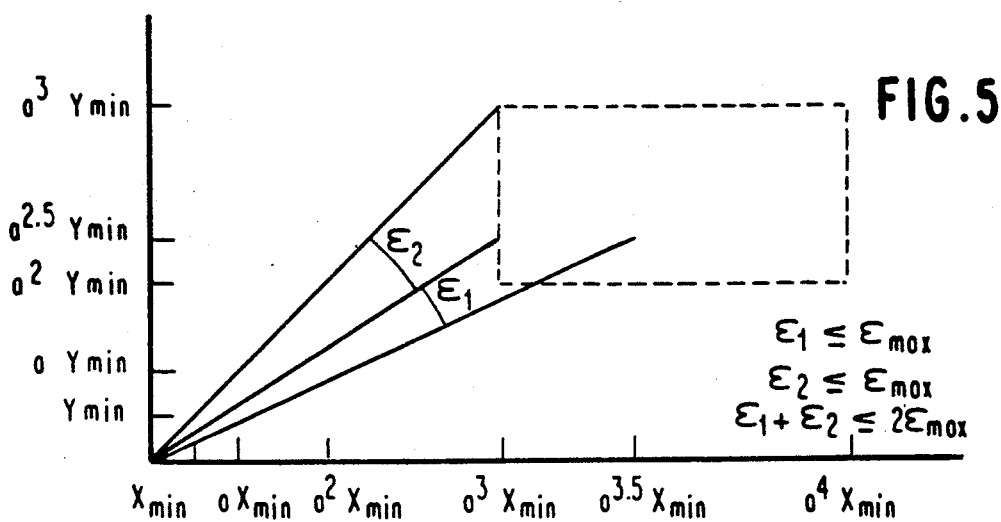
FIG. 5 illustrates resulting quantization errors of X and Y.

If it is desired to find the value of $$\phi = \tan^{-1}(Y/X),$$

and X is quantized into intervals of the form $(X_{sin}, aX_{min})$, $(aX_{min}, a^2X_{min})$ ... and similarly for Y, and the quantization value is taken as the geometric mean of the interval, then the quantization of X and Y will cause an error of no greater than $2\epsilon_{max}$ in the value of $\phi$, as illustrated in FIG. 5. If on the other hand, it is desired to find the value of $$\beta = \tan^{-1}(\sqrt{Y}/\sqrt{X})$$

and X and Y are quantized as above, then the error resulting from the quantization will be no greater than $\epsilon_{max}$. This is true because quantizing X in steps of a is equivalent to quantizing $\sqrt{X}$ in steps of $\sqrt{a}$. For a small $\epsilon_{max}$, it is easy to show that if a corresponds to $\epsilon_{max}$, then the $\sqrt{a}$ corresponds approximately to $\frac{1}{2}\epsilon_{max}$. Relating the above to the present invention, values along the X axis are of the form $X_0^2+X_e^2$ where $X_0$ and $X_e$ are each 8 bits, i.e., they are integers between $-127$ and $+127$.

Assigning a quantization value of 0 for the case $X_0^2+X_e^2=0$, intervals can be formed beginning with $X_0^2+X_e^2=1$, the intervals being of the form: (1, a), (a, $a^2$), ($a^2$, $a^3$) . . ., where the value of a is chosen such that $A^{255}=127^2+127^2$, i.e., such that 255 intervals are assigned to all non-zero values of $X_0^2+X_e^2$. Accordingly, this provides the results that $a = 1.04155$, i.e., $\sqrt{a}=1.02056$.

From equations (1) and (2) above, the corresponding maximum error in evaluating $\hat{\theta}$ would be about 1°.

Further improvements are possible by noticing that for small values of $X_0^2+X_e^2$, the interval ($X_n$, $aX_n$) could be empty. Indeed, since $X_0^2+X_e^2$ cannot take values between 1 and 2, it follows that the 16 intervals $(a, a^2) = (1.04, 1.08)$
$(a^2, a^3) = (1.08, 1.13)$
.
.
.
$(a^{16}, a^{17}) = (1.91, 1.998)$ will all be empty.

Therefore, a list of the values of $X_o^2+X_e^2$ in the order of increasing magnitude is shown in Table 1. It has been determined by experimentation that there were 42 values of the sum of squares under 100. Since $a^{42}=5.5 \leq 100$, it is possible to assign each of these 42 values a quantized value equal to itself (i.e., perfect quantization), while at the same time providing better quantization for the values $\geq 100$. This follows because only 42 intervals would have been assigned so far, as opposed to 113 ($a^{113} \approx 100$) intervals that would have been assigned had deviation from the logarithmic quantization rule not occurred.

For values $X_0^2+X_e^2<100$, the quantization intervals collapse to single points, the regions between those points being values that are impossible for $X_0^2+X_e^2$ to obtain.

Proceeding with the larger values of $X_0^2+X_e^2$, because the sum of squares of integers follows a regular pattern, an advantage can be obtained by distorting the shape of the intervals from the logarithmic rule, thus finding better quantization values. This is performed for values of $X_o^2+X_e^2$ up to 442 as shown in Table 1. For larger values, the benefits of deviating from the logarithmic quantization rules become increasing small and not worth pursuing. Thus, the values from 445 (the sum of squares following 442) up to 32,258 were divided into 160 intervals (since 96 out of the 256 intervals had already been assigned). By setting $a^{160} = 32,258/445$, it is determined that $a = 1.027133$. An examination of Table 1 reveals that for all 256 intervals, the ratio between the upper end of the interval to the lower end is $\leq a$.

The logarithmic rule of quantization assigns a geometric mean of the interval as the quantization value. However, since $\sqrt{a} \approx 1+(a/2)$, the arithmetic mean is used instead for simplicity. The complete listing is shown in Table 1.

With value of $a=1.027133$, or equivalent $\sqrt{a}=1.0134757$, the maximum error in computing $\theta$ resulting from quantization may be found from equations (1) and (2), and in this case, comes out to be 0.39°.

The PROM implementation that carries out the method of the present invention is shown in FIGS. 3A and 3B. Two PROMs are used in the implementation. As shown in FIG. 3A, the inputs to the first PROM 100 are $X_0$ and $X_e$ (and later $Y_0$ and $Y_e$, as shown in FIG. 3B), and the output is an 8-bit code indicating which of the 256 intervals $X_0^2+X_e^2$ falls into, and this is stored in latch 102. The output is more accurate than having the quantized value itself at the output, since an 8-bit representation of the quantized values will introduce substantial round-off errors for small values. The second PROM 104 assigns the quantized value to the output code of the first PROM for both the X and Y inputs, evaluates the square root and the arc tangent, and a value for $\hat{\theta}$ is provided at the output.

The value of $\hat{\theta}$ at the output is limited to 8 bit accuracy. Therefore, if the 90° interval is quantized for $\hat{\theta}$ into 256 values, a quantization interval of (90/256)=0.35 is obtained. This value is smaller than the 0.39° value obtained above. Accordingly, this means that the maximum error in evaluating $\hat{\theta}$ will be 0.7°. If the quantization interval is increased to 0.40°, this provides a guarantee that the maximum error in evaluating $\hat{\theta}$ will be less than or equal to 0.40°.

Thus, the present invention provides an accurate estimate of the carrier phase of the unmodulated preamble using only 2 PROMs and a latch.

TABLE 1

| VALUE OF SUM OF SQUARES | ASSIGNED CODE |
|---|---|
| 0 | 0 |
| 1 | 1 |
| 2 | 2 |
| 4 | 3 |
| 5 | 4 |
| 8 | 5 |
| 9 | 6 |
| 10 | 7 |
| 13 | 8 |
| 16 | 9 |
| 17 | 10 |
| 18 | 11 |
| 20 | 12 |
| 25 | 13 |
| 26 | 14 |
| 29 | 15 |
| 32 | 16 |
| 34 | 17 |
| 36 | 18 |
| 37 | 19 |
| 41 | 21 |
| 45 | 22 |
| 49 | 23 |
| 50 | 24 |
| 52 | 25 |
| 53 | 26 |
| 58 | 27 |
| 61 | 28 |
| 64 | 29 |
| 65 | 30 |
| 68 | 31 |
| 72 | 32 |
| 73 | 33 |
| 74 | 34 |
| 80 | 35 |
| 81 | 36 |
| 82 | 37 |
| 85 | 38 |
| 89 | 39 |
| 90 | 40 |
| 97 | 41 |
| 98 | 42 |
| 100–101 | 43 |
| 104 | 44 |
| 106 | 45 |
| 109 | 46 |
| 113 | 47 |
| 116–117 | 48 |
| 121–122 | 49 |
| 125 | 50 |
| 128 | 51 |
| 130 | 52 |

TABLE 1-continued

| VALUE OF SUM OF SQUARES | ASSIGNED CODE |
|---|---|
| 136–137 | 53 |
| 144–146 | 54 |
| 148–149 | 55 |
| 153 | 56 |
| 157 | 57 |
| 160 | 58 |
| 162–164 | 59 |
| 169–170 | 60 |
| 173 | 61 |
| 178 | 62 |
| 180–181 | 63 |
| 185 | 64 |
| 193–194 | 65 |
| 196–197 | 66 |
| 200–202 | 67 |
| 205–208 | 68 |
| 212 | 69 |
| 218–221 | 70 |
| 225–229 | 71 |
| 232–234 | 72 |
| 241–245 | 73 |
| 250 | 74 |
| 256–257 | 75 |
| 260–261 | 76 |
| 265–269 | 77 |
| 272–274 | 78 |
| 277–281 | 79 |
| 288–290 | 80 |
| 292–293 | 81 |
| 296–298 | 82 |
| 305–306 | 83 |
| 313–317 | 84 |
| 320–328 | 85 |
| 333–340 | 86 |
| 346–349 | 87 |
| 353–356 | 88 |
| 360–365 | 89 |
| 369–377 | 90 |
| 386–389 | 91 |
| 392–397 | 92 |
| 400–410 | 93 |
| 416–425 | 94 |
| 433–442 | 95 |
| 445–457 | 96 |
| 458–469 | 97 |
| 470–482 | 98 |
| 483–495 | 99 |
| 496–508 | 100 |
| 509–522 | 101 |
| 521–536 | 102 |
| 537–551 | 103 |
| 552–566 | 104 |
| 567–581 | 105 |
| 582–597 | 106 |
| 598–613 | 107 |
| 614–630 | 108 |
| 631–647 | 109 |
| 648–664 | 110 |
| 665–682 | 111 |
| 683–701 | 112 |
| 702–720 | 113 |
| 721–740 | 114 |
| 741–760 | 115 |
| 761–780 | 116 |
| 781–801 | 117 |
| 802–823 | 118 |
| 824–846 | 119 |
| 847–869 | 120 |
| 870–892 | 121 |
| 893–916 | 122 |
| 917–941 | 123 |
| 942–967 | 124 |
| 963–993 | 125 |
| 994–1020 | 126 |
| 1021–1048 | 127 |
| 1049–1076 | 128 |
| 1077–1105 | 129 |
| 1106–1135 | 130 |
| 1136–1166 | 131 |
| 1167–1198 | 132 |

TABLE 1-continued

| VALUE OF SUM OF SQUARES | ASSIGNED CODE |
|---|---|
| 1199–1230 | 133 |
| 1231–1264 | 134 |
| 1265–1298 | 135 |
| 1299–1333 | 136 |
| 1334–1369 | 137 |
| 1370–1407 | 138 |
| 1408–1445 | 139 |
| 1446–1484 | 140 |
| 1485–1524 | 141 |
| 1525–1566 | 142 |
| 1567–1608 | 143 |
| 1609–1652 | 144 |
| 1653–1697 | 145 |
| 1698–1743 | 146 |
| 1744–1790 | 147 |
| 1791–1838 | 148 |
| 1839–1888 | 149 |
| 1889–1940 | 150 |
| 1941–1992 | 151 |
| 1993–2046 | 152 |
| 2047–2102 | 153 |
| 2103–2159 | 154 |
| 2160–2218 | 155 |
| 2219–2278 | 156 |
| 2279–2340 | 157 |
| 2341–2403 | 158 |
| 2404–2468 | 159 |
| 2469–2535 | 160 |
| 2536–2604 | 161 |
| 2605–2675 | 162 |
| 2676–2747 | 163 |
| 2748–2822 | 164 |
| 2823–2898 | 165 |
| 2899–2977 | 166 |
| 2978–3058 | 167 |
| 3059–3141 | 168 |
| 3142–3226 | 169 |
| 3227–3314 | 170 |
| 3315–3404 | 171 |
| 3405–3496 | 172 |
| 3497–3591 | 173 |
| 3592–3688 | 174 |
| 3689–3788 | 175 |
| 3789–3891 | 176 |
| 3892–3997 | 177 |
| 3998–4105 | 178 |
| 4106–4217 | 179 |
| 4218–4331 | 180 |
| 4332–4448 | 181 |
| 4449–4569 | 182 |
| 4570–4693 | 183 |
| 4694–4821 | 184 |
| 4822–4951 | 185 |
| 4952–5086 | 186 |
| 5087–5224 | 187 |
| 5225–5365 | 188 |
| 5366–5511 | 189 |
| 5512–5661 | 190 |
| 5662–5814 | 191 |
| 5815–5972 | 192 |
| 5973–6134 | 193 |
| 6135–6300 | 194 |
| 6301–6471 | 195 |
| 6472–6647 | 196 |
| 6648–6827 | 197 |
| 6828–7013 | 198 |
| 7014–7203 | 199 |
| 7204–7398 | 200 |
| 7399–7599 | 201 |
| 7600–7805 | 202 |
| 7806–8017 | 203 |
| 8018–8235 | 204 |
| 8236–8458 | 205 |
| 8459–8688 | 206 |
| 8689–8923 | 207 |
| 8924–9166 | 208 |
| 9167–9414 | 209 |
| 9415–9670 | 210 |
| 9671–9932 | 211 |
| 9933–10202 | 212 |

TABLE 1-continued

| VALUE OF SUM OF SQUARES | ASSIGNED CODE |
| --- | --- |
| 10203–10478 | 213 |
| 10479–10763 | 214 |
| 10764–11055 | 215 |
| 11056–11355 | 216 |
| 11356–11663 | 217 |
| 11664–11979 | 218 |
| 11980–12304 | 219 |
| 12305–12638 | 220 |
| 12639–12981 | 221 |
| 12982–13333 | 222 |
| 13334–13695 | 223 |
| 13696–14067 | 224 |
| 14068–14448 | 225 |
| 14449–14840 | 226 |
| 14841–15243 | 227 |
| 15244–15657 | 228 |
| 15658–16082 | 229 |
| 16083–16518 | 230 |
| 16519–16966 | 231 |
| 16967–17426 | 232 |
| 17427–17899 | 233 |
| 17900–18385 | 234 |
| 18386–18884 | 235 |
| 18885–19396 | 236 |
| 19397–19923 | 237 |
| 19924–20463 | 238 |
| 20464–21018 | 239 |
| 21019–21589 | 240 |
| 21590–22174 | 241 |
| 22175–22776 | 242 |
| 22777–23394 | 243 |
| 23395–24029 | 244 |
| 24030–24681 | 245 |
| 24682–25351 | 246 |
| 25352–26038 | 247 |
| 26039–26745 | 248 |
| 26746–27471 | 249 |
| 27472–28216 | 250 |
| 28217–28982 | 251 |
| 28983–29768 | 252 |
| 29769–30576 | 253 |
| 30577–31405 | 254 |
| 31406–32258 | 255 |

I claim:

1. A method for estimating carrier phase of an unmodulated preamble from a digital signal having both first and second channels in a digital burst mode communication system, said method comprising the steps of obtaining a succession of alternating odd-numbered and even-numbered samples from each of said first and second channels, determining a first quantity by combining odd-number samples from said first channel, determining a second quantity by combining even-numbered samples from said first channel, determining a third quantity by combining odd-numbered samples from said second channel, determining a fourth quantity by combining evennumbered samples from said second channel, and generating a carrier phase estimate in accordance with said first through fourth quantities, wherein said generating step comprises the further steps of:

addressing a first storage device simultaneously with a first signal representing said first quantity and a second signal representing said second quantity to read out of said first storage device a first coded signal representing a quantity which is a function of said first and second quantities;

storing said first coded signal in a first coded signal storage device;

addressing said first storage device simultaneously with a third signal representing said third quantity and a fourth signal representing said fourth quantity to read out of said first storage device a second coded signal which is said function of said third and fourth quantities; and simultaneously addressing a second storage device with said first and second coded signals to obtain said carrier phase estimate.

2. An apparatus for estimating carrier phase of an unmodulated preamble from a digital signal having both first and second channels in a digital burst mode communication system, said apparatus comprising:

sampling means for obtaining samples from each of said first and second channels, said samples including odd samples and even samples from each of said channels;

first storage means for receiving as addresses said odd and even samples from both of said first and second channels and for outputting first and second codes respectively corresponding to first and second quantization intervals;

second storage means for receiving as addresses said first and second codes and for outputting a particular estimate of the carrier phase, said second storage means comprising memory means for storing a plurality of carrier phase estimates and addressed by said first and second codes to read out said particular carrier phase estimate.

3. An apparatus according to claim 2, wherein said first coded signal represents a quantization level corresponding to the value of $(X_o^2 + X_e^2)$ and said second coded signal represents a quantization level corresponding to the value of $(Y_o^2 + Y_e^2)$, where $X_o$ is a value derived from said odd samples of said first channel, $X_e$ is a value derived from said even samples of said first channel, $Y_o$ is a value derived from said odd samples of said second channel and $Y_e$ is a value derived from said even samples of said second channel.

4. An apparatus according to claim 2, wherein said first storage means produces said first coded signal at a first time and stores said first coded signal, produces said second coded signal at a second time subsequent to said first time, and simultaneously provides said second coded signal and said stored first coded signal to said second storage means for reading out said particular carrier phase estimate.

* * * * *